April 22, 1930.   D. B. FAWCETT   1,755,639
PRESSURE REGULATING VALVE
Filed Aug. 2, 1928
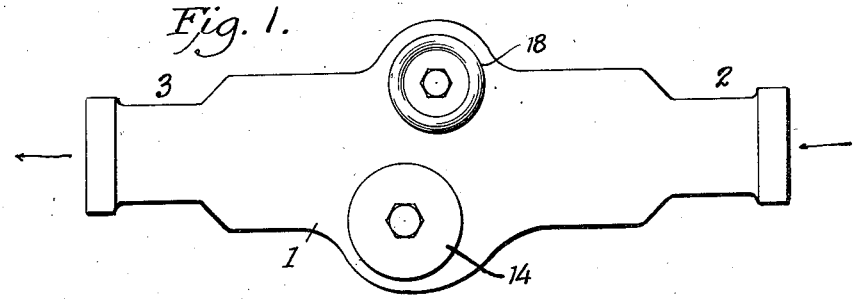
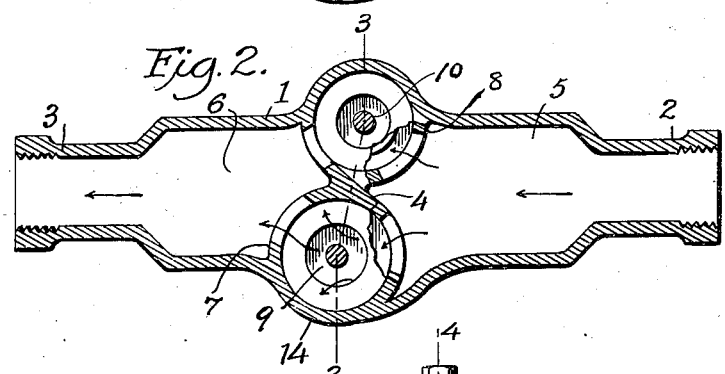
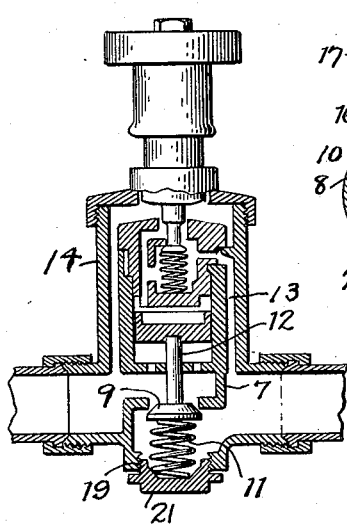
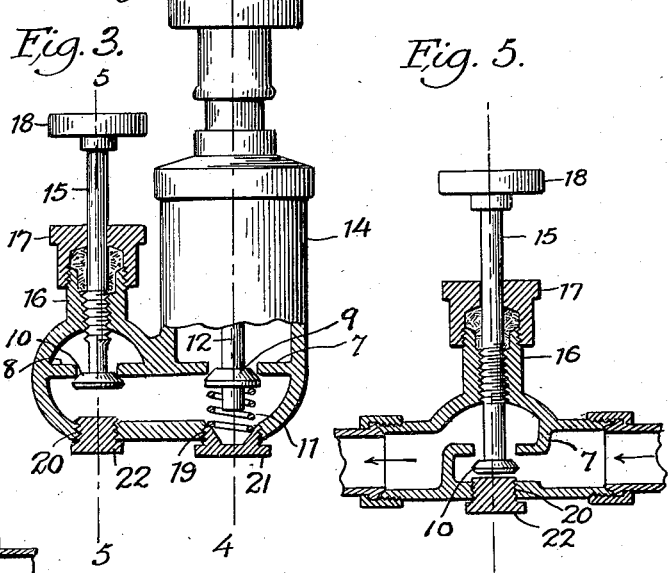
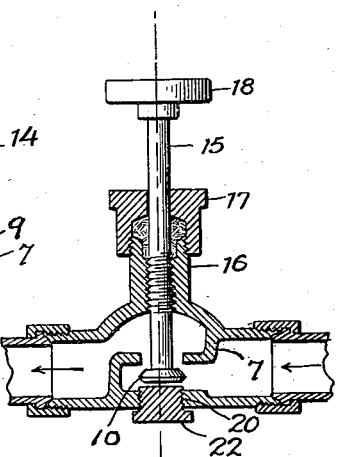
INVENTOR:
David B. Fawcett,
BY C. C. Hines,
ATTORNEY.

Patented Apr. 22, 1930

1,755,639

UNITED STATES PATENT OFFICE

DAVID B. FAWCETT, OF WASHINGTON, DISTRICT OF COLUMBIA

PRESSURE-REGULATING VALVE

Application filed August 2, 1928. Serial No. 297,081.

This invention relates to pressure regulating valves of that type used in fluid pressure supply systems wherein the valve is designed to maintain a predetermined pressure in a line furnished with fluid pressure from any suitable source of supply. More especially the invention relates to a fluid pressure regulating valve which, while capable of use in any fluid pressure system, is particularly designed for use to regulate the flow of a heating fluid, such as steam, from a steam generator to a supply line, such, for example, as from a locomotive to the cars of a train heated by steam furnished from the locomotive steam boiler.

In systems of the character mentioned it quite often happens that the valve proper sticks, or the valve stem becomes bent or the valve otherwise becomes inoperative and unduly reduces or cuts off the flow of fluid from the source of supply to the line. This is especially disadvantageous where the valve of a train heating system is concerned, which is usually arranged in a confined space upon the locomotive, or where the valve is otherwise so placed that it is difficult to reach for adjustment or repairs. To overcome this objection and to prevent the reduction or the casual cutting off of the flow of fluid, it has been proposed to provide such valves with valved by-passes, the valve of which is opened, when the main valve becomes inoperative, to maintain the flow of fluid until the main valve can again be placed in serviceable condition. Usually such by-passes consist of a branch pipe containing a control valve and tapped into the regulating valve casing or the main conductor on opposite sides of the main valve. By-passes of this character, however, are subject to leakage or fracture and take up more or less room and are liable to constrict the flow of fluid and are, therefore, troublesome and difficult or impossible to use where the valve must fit in a very confined space.

One object of my invention is to provide a pressure regulating valve with a by-pass which is enclosed with the main valve passage and the valves proper in the valve casing so as to make the device as a whole one of unitary structure in which all parts of the device, except the operating means for adjusting the by-pass valve, are housed and protected from injury, and which is of compact character so as to be used in confined spaces without inconvenience or interference with other parts of the equipment.

Another object of the invention is to provide a valve of this type which is strong and durable and not easily liable to leakage or damage.

The invention consists of the features of construction, combination and arrangement of parts, hereinafter fully described and claimed, reference being had to the accompanying drawing, in which:—

Figure 1 is a top plan view of a pressure regulating valve embodying my invention.

Figure 2 is a horizontal longitudinal section thereof.

Figure 3 is a cross-section on line 3—3 of Figure 2.

Figures 4 and 5 are sections on the lines 4—4 and 5—5 of Figure 3.

In carrying out my invention into practice, I provide an elongated valve casing 1 having reduced inlet and discharge end portions 2 and 3 arranged in longitudinal alinement for connection respectively with sections of piping leading from the source of fluid supply and to the line to be supplied. The intermediate or body portion of this casing is divided by a partition 4 into compartments 5 and 6 separated by the partition from each other and communicating, respectively, with the intake ends 2 and 3 with which they are arranged in axial alinement. The partition 4 is substantially 8-shaped in horizontal transverse section and includes ported partition portions 7 and 8 formed between the intermediate portion of the partition 4 and the opposite sides of the casing out of transverse alinement with each other in order to reduce the width of the casing and each constructed for the upflow of the fluid therethrough from the intake end to the discharge end of the casing, or between the respective compartments 5 and 6.

The partition portions 7 and 8 are respectively controlled by valve members 9 and 10. The valve member 9 is movable upwardly and downwardly, respectively, to control the port in the partition 7 and is located between the ported wall of said partition and the base of the body of the casing 1. Said valve member 9 comprises the main valve of an automatic pressure regulator valve of the Leslie or other suitable type, which is adapted to be moved to closed position by the action of a spring 11 and to be opened under a predetermined pressure against the resistance of the spring by the action of a pressure controlled piston 12, subjected to pressure from the intake side of the casing through a feed port 13. The pressure regulator valve includes a casing body 14 which may be formed as an integral part of the valve casing 1 and which contains the usual adjusting or regulating means (not shown) for governing the action of the piston 12 so as to adapt the valve 9 to be maintained in open position at any predetermined pressure. I have not deemed it necessary to show the construction of the pressure regulator valve in detail, as the Leslie type of valve, or any equivalent character of valve, may be employed for the purpose, and as the details of construction of the pressure regulator valve are not essential to the present invention.

The valve member 10 forms with the ported partition 8 a by-pass connection between the intake and discharge ends of the casing. This valve member is located beneath the ported part of the partition 8 and between the same and the bottom of the valve casing 1 and is movable upwardly and downwardly, respectively, to close and open the port in said partition. The valve is carried by a screw stem 15 mounted in a suitable stuffing box 16 containing suitable packing to prevent leakage and provided with a screw-threaded follower or closure cap 17 for confining and adjusting the packing as occasion requires. The upper end of the stem 15 is provided with a suitable knob or handle 18 whereby the valve member 10 may be opened and closed and adjusted to any desired open position for regulating the flow of fluid through the by-pass. Provided in the casing body 1 below the valve members are openings 19 and 20 closed by screw plugs 21 and 22, respectively, through which access may be obtained to the valve members and their seats for permitting introduction and removal of the valves, grinding of the valve seats and cleaning of the associated parts of the casing. These openings are also of use in permitting of the discharge of the sand or other molding material in molding the valve casing, as will be readily understood.

In the operation of the valve device, the ends 2 and 3 of the valve casing are connected between two sections of piping leading from a source of supply of steam or other fluid and to the heating system or line to be supplied with the fluid, and the valve member 10 is closed to cut off the flow of fluid through the by-pass, while the valve member 9 is opened and the regulating mechanism of the pressure regulator valve set to maintain said valve in a predetermined open position under a predetermined pressure, for a regulated supply of the steam or other fluid to the line or system. The valve device may be used in this connection upon a locomotive for governing the supply of steam from the locomotive steam boiler through the steam heating line to the steam heating equipment of the cars of a train, or it may be employed in the steam heating systems of buildings of various kinds, or in other fluid pressure supply systems of various kinds, wherever and whenever it is desired to maintain a regulated flow of fluid from a source of supply to a line or system to be supplied with fluid. The system will therefore be supplied with a regulated quantity of fluid as long as the automatic pressure regulating device operates in a normal manner, but in the event of the sticking of the valve member 9 or of said valve member becoming bound from other causes, as the bending of its valve stem, the supply of fluid from the source to the system will be either unduly cut down or entirely arrested. Under these conditions it is necessary to repair or replace the valve member 9, but this can not always be accomplished while the supply system is in operation or within a reasonable period of time and it is desirable under such conditions to provide a means whereby, notwithstanding the inoperativeness of the automatic valve, the flow of fluid through the valve and to the system may be obtained. The by-pass valve herein-disclosed is provided for this purpose, so that, in the event of the automatic valve becoming partially or wholly inoperative from any cause, the valve member 10 may be opened to any desired extent to maintain the flow of fluid to the system to be supplied. This can be accomplished instantaneously, as soon as derangement of the automatic valve is detected, so that there will be no interruption to the supply of steam or other fluid to the service system.

My invention provides, therefore, a valve which normally performs the function of an automatic pressure regulating valve, but which, in the event that the automatic valve is rendered inoperative, it may be maintained in active service by simply opening the by-pass valve. In this structure the valve casing is so formed as to take up little room, and the partitions and valve members arranged and enclosed therein in such manner, that a duplex valve of very simple and compact construction is provided wherein the valve ports and valve members proper are arranged within the confines of the chambered portion of the casing, and which, therefore, may be used upon a locomotive or in a supply system within a constricted space. By this means the objections to valves having externally arranged by-pass piping, which can not be conveniently arranged in contracted spaces, and are always liable to leakage, are obviated in a simple and reliable manner. Other advantages of the device are that it may be installed and removed with great convenience and within a short period of time, and a strong and durable device not liable to fracture from strains or blows or other extraneous causes produced. It will be observed that the ported partitions 7 and 8 are arranged on opposite sides of the longitudinal center of the valve casing and out of transverse alinement with one another, this arrangement permitting of the more ready formation of the parts of the apparatus and arrangement of the valve members so that they will operate without interference with each other and may be provided in one and the same valve without making the valve body of excessive width.

Having thus described my invention, I claim:—

1. A valve of the character described comprising an elongated valve casing having a central chamber and intake and discharge ends, a ported partition within the casing chamber, an automatic pressure controlled valve governing the flow of fluid through said ported partition between said ends of the casing, a second ported partition within the casing, and a by-pass valve controlling the flow of fluid through said second ported partition between said ends of the casing, said valves having opening and closing movements in the same directions and governing the flow of fluid in the same direction through the respective partitions from end to end of the casing.

2. A valve of the character described comprising an elongated valve casing having a body portion terminating in intake and discharge ends, all arranged in axial alinement, a pair of independent ported partitions arranged within and on opposite sides of the longitudinal center of the body portion of the casing, between said ends of the casing and communicating therewith, an automatic pressure controlled valve controlling the flow of fluid through one of said ported partitions, and a by-pass valve controlling the flow of fluid through the other ported partition.

3. A valve of the character described comprising an elongated valve casing having a body portion terminating in intake and discharge ends all arranged in axial alinement, a pair of independent ported partitions arranged within and on opposite sides of the longitudinal center of the body of the casing, between said ends of the casing and each formed for the upflow of fluid through from the intake end to the discharge end of the casing, an automatic pressure controlled valve controlling the flow of fluid through one of said ported partitions, and a by-pass valve controlling the flow of fluid through the other ported partition.

4. A valve of the character described comprising an elongated valve casing having a central chamber and intake and discharge ends located in axial alinement and provided with a pair of separate ported partitions therein arranged at opposite sides of the longitudinal center of the central chamber thereof and out of transverse alinement with each other, an automatic pressure controlled valve controlling the flow of fluid through one of said ported partitions, and a by-pass valve controlling the flow of fluid through the other ported partition.

5. A valve of the character described comprising a elongated valve casing having a central chamber and intake and discharge ends located in axial alinement and provided with a pair of separate ported partitions therein arranged at opposite sides of the longitudinal center of the central chamber thereof and out of transverse alinement with each other, the ports in said partitions being provided with valve seats and each formed for the upflow therethrough of fluid from the intake end to the discharge end of the casing, an automatic pressure controlled valve controlling the flow of fluid through one of said ported partitions, and a by-pass valve controlling the flow of fluid through the other ported partition.

6. A valve of the character described comprising an elongated casing having a central chamber and intake and discharge ends located in axial alinement, a transverse partition in said casing chamber between said ends and of substantially 8-shaped formation and including ported partition portions located between the longitudinal center and opposite sides of the casing, an automatic pressure controlled valve controlling the flow of fluid through one of said ported partitions, and a by-pass valve controlling the flow of fluid through the other ported partition.

7. A valve of the character described comprising an elongated casing having a central chamber and intake and discharge ends arranged in axial alinement, a transverse partition in said casing chamber between said ends and of substantially 8-shaped formation and including ported partition portions located between the longitudinal center and opposite sides of the casing and out of transverse alinement with each other, a downwardly opening automatic pressure controlled valve controlling the flow of fluid through one of said ported partitions, and a downwardly opening by-pass valve controlling the flow of fluid through the other ported partition.

8. A valve of the character described comprising a casing having an elongated body terminating in axially alined intake and discharge ends, a transverse partition in the body of said casing between said ends and of substantially 8-shaped formation and including ported partition portions located between the longitudinal center and opposite sides of the casing and out of transverse alinement with each other, an automatic pressure controlled valve controlling the flow of fluid through one of said ported partitions, and a by-pass valve controlling the flow of fluid through the other ported partition.

9. A valve of the character described comprising a casing having a chambered body and intake and discharge ends located substantially in axial alinement, the body of said casing being of greatest dimensions in the direction of said intake and discharge ends, said body having intermediate of its length a partition provided with a pair of separate upflow passages communicating respectively at relatively low and high levels with the portions of the chamber of the body located at opposite sides of the partition and connecting with said intake and discharge ends for the flow of liquid between said ends, an automatic pressure controlled valve governing one of said passages, and a hand-operated valve governing the other passage.

In testimony whereof I affix my signature.

DAVID B. FAWCETT.